US009614958B2

(12) United States Patent
Radermacher et al.

(10) Patent No.: US 9,614,958 B2
(45) Date of Patent: Apr. 4, 2017

(54) PREDICTIVE COMPUTER NETWORK SERVICES PROVISIONING FOR MOBILE USERS

(75) Inventors: Klaus Radermacher, Bad Honnef (DE); Nicholas Bambos, Hillsborough, CA (US)

(73) Assignees: DEUTSCHE TELEKOM AG, Bonn (DE); THE TRUSTEES OF THE LELAND STANFORD JUNIOR UNIVERSITY, Palo Alto, CA (US)

(*) Notice: Subject to any disclaimer, the term of this patent is extended or adjusted under 35 U.S.C. 154(b) by 623 days.

(21) Appl. No.: 12/075,098

(22) Filed: Mar. 5, 2008

(65) Prior Publication Data

US 2009/0029692 A1    Jan. 29, 2009

Related U.S. Application Data

(60) Provisional application No. 60/921,226, filed on Mar. 29, 2007.

(51) Int. Cl.
*H04M 3/42* (2006.01)
*H04W 4/02* (2009.01)
*H04L 29/08* (2006.01)

(52) U.S. Cl.
CPC ........ *H04M 3/42348* (2013.01); *H04L 67/18* (2013.01); *H04L 67/306* (2013.01);
(Continued)

(58) Field of Classification Search
CPC ................ G06Q 10/109; G06Q 10/06; G06Q 10/063116; G06Q 10/1097; G06Q 10/02; G06Q 10/047; G06Q 10/06311; G06Q 10/06312; G06Q 10/06315; H04L 67/18; H04L 67/306; H04L 67/325; H04L 67/22; H04L 67/34; H04W 4/02; H04W 4/028;
(Continued)

(56) References Cited

U.S. PATENT DOCUMENTS 5,825,759 A    10/1998 Liu
5,881,231 A *  3/1999 Takagi et al. ................ 709/212
(Continued)

FOREIGN PATENT DOCUMENTS

WO    WO 2006/100955 A1 *  9/2006  ............... H04Q 7/38

OTHER PUBLICATIONS

Dagiuklas et al, Evolute Architecture Specification, IST-2001-32449 D2.1, 2002. <http://www.fokus.fraunhofer.de/bereichsseiten/kompetenzzentrum/mobis/Publikationen/2002/EVOLUTE_D2.1_F.
(Continued)

*Primary Examiner* — Thai Vu
(74) *Attorney, Agent, or Firm* — Leydig, Voit & Mayer, Ltd.

(57) ABSTRACT

A predictive network service provisioning method uses personal schedule information of a user [120] to predict the geographic/network location of the user, the operational context of a user, and/or the computation and communication needs of a user. These predicted user attributes may be used to reduce network latency by prepositioning user data [122] at a location [126] closer to the user, allocating services and/or resources for the user at the predicted location, and/or providing the user with access to the prepositioned personal data files [138] and services when requested by the user.

19 Claims, 2 Drawing Sheets

(52) U.S. Cl.
CPC ......... *H04M 3/42127* (2013.01); *H04W 4/02* (2013.01); *H04M 2203/2072* (2013.01); *H04M 2242/30* (2013.01)

(58) Field of Classification Search
CPC ............. H04W 28/26; H04M 3/42348; H04M 3/42127; H04M 2203/2072; H04M 2242/30
USPC .......... 455/414.1, 450–452.2, 464, 436, 442, 455/432.1, 432.3, 435.1, 435.2, 438, 439; 379/351
See application file for complete search history.

(56) References Cited

U.S. PATENT DOCUMENTS

| | | | |
|---|---|---|---|
| 6,480,830 B1 * | 11/2002 | Ford et al. .................. | 705/7.19 |
| 6,662,012 B1 | 12/2003 | Do | |
| 7,149,964 B1 | 12/2006 | Cottrille et al. | |
| 2001/0053694 A1 * | 12/2001 | Igarashi et al. ............... | 455/433 |
| 2002/0136226 A1 * | 9/2002 | Christoffel et al. .......... | 370/401 |
| 2002/0198991 A1 | 12/2002 | Gopalakrishnan et al. | |
| 2005/0137981 A1 * | 6/2005 | Maes ............................... | 705/44 |
| 2005/0227684 A1 | 10/2005 | Niedermeier et al. | |
| 2006/0013140 A1 | 1/2006 | Pushparaj | |
| 2006/0072726 A1 | 4/2006 | Klein et al. | |
| 2006/0088011 A1 | 4/2006 | Lyer et al. | |
| 2008/0130563 A1 * | 6/2008 | Xu et al. ....................... | 370/329 |

OTHER PUBLICATIONS

Eurescom, "MobilUS: Next generation Mobile Information Services on UMTS," Nov. 2001. <http://www.eurescom.de/~pub-deliverables/P1100-series/P1105/TI1/p1105ti1.

Matsunaga et al., "Secure Authentication System for Public WLAN Roaming," WMASH '03, Sep. 19, 2003, San Diego, California, USA. <http://sahara.cs.berkeley.edu/papers/PWANAUTH.pdf>.

* cited by examiner

PREDICTIVE COMPUTER NETWORK SERVICES PROVISIONING FOR MOBILE USERS

CROSS-REFERENCE TO RELATED APPLICATIONS

This application claims priority from U.S. Provisional Patent Application 60/921,226 filed Mar. 29, 2007, which is incorporated herein by reference.

FIELD OF THE INVENTION

The present invention relates generally to computer network services. More specifically, it relates to methods for providing improved network services to mobile users.

BACKGROUND OF THE INVENTION

Consider an internet user who lives and (primarily) works in a geographical area A, receiving service from some internet service provider ISP(A) server 104, as shown in FIG. 1A. When the user 100 travels to another geographical area B, the user connects to the internet via a service provider ISP(B) server 106 that serves area B. When the user 100 attempts to access his files, read email, or otherwise work from area B on his internet account hosted by ISP(A), then:
1. A logical data session is set up from the user's terminal (for example, PDA1 or laptop computer) in area B to an authentication server of ISP(A), so that the user first gets authenticated (for example, via login name and password).
2. Following authentication, the user can access over the internet 108 his account files and other user data 102 (for example, mail or text files) which reside on an ISP(A) server 104.
3. When increased security is required (for example, for business users), virtual private network (VPN) sessions may be established from the user terminal in area B to the ISP(A) server 104.

Although user data files may be transferred to and cached on the user terminal in area B, the primary user data content 102 is stored in servers at ISP(A).

With increased travel mobility of business (and leisure) internet users, the above standard operational scheme creates data access latency and network congestion, given that any data access request needs to be transferred through a data access path 112 including a sequence of routers 110 connecting area B to A and (in response) user data files from area A to B in real time, potentially across the globe.

Moreover, some computing applications and information services (e.g., real-time applications, such as voice or video) suffer unacceptable levels of degradation when the latency is significant. Sending IP packets back and forth via VPNs halfway around the globe and thus transporting large amounts of data can hinder and even cripple such real-time applications and services.

SUMMARY OF THE INVENTION

In one aspect, the present invention provides a method for predictive network service provisioning for mobile users. The method predicatively performs actions related to network provisioning for a user based on personal schedule information available on the network. More specifically, a future attribute of the user is predicted based on personal schedule information of the user, and computer network services are provisioned based on the predicted future attribute. The future attribute is a property of the user that has implications for computing services in the future. For example, the future attribute may be geographic location, type of activity, environment, and so on.

In one aspect, the method predicts (precisely or approximately within a certain area) the geographic location or area (and hence the network location) of a user (person) at a future time from personal schedule information available on the network (e.g., residing on electronic calendars, reservation databases for flights, performances, train or bus rides, restaurants, etc. and made available by the user or his secretary, proxy, selectively to all or some trusted parties).

In another aspect, the invention provides a method for predicting (precisely or approximately) the operational context of a user (is he in the office, home, plane, train, restaurant, working or playing or eating or sleeping, meeting room or personal office? etc.) of a user (person) at a future time from personal schedule information available on the network (e.g., residing on electronic calendars, reservation databases for flights, performances, train or bus rides, restaurants, etc. and made available by the user or his secretary, proxy, selectively to all or some trusted parties).

In another aspect, the invention provides a method for predicting (precisely or approximately) the computation and communication needs of a user (e.g., which of his files is he more likely to need to access, which of his subscribed services is he more likely to need to access, which databases is he more likely to need to access, how much communication and computation bandwidth and other resources is he more likely to need for the above, etc.) at a future time from personal schedule information available on the network (e.g., residing on electronic calendars, reservation databases for flights, performances, train or bus rides, restaurants, etc. and made available by the user or his secretary, proxy, selectively to all or some trusted parties).

In another aspect of the invention, the predictions above may be used to enable one or more additional functionalities. For example, a method is provided for selecting a subset of personal data files of the user (from data positioning preferences set by the user, and from all or some of the above predictions) and transporting and positioning, prior to the said future time, the selected subset of personal data files to a server in or near the predicted geographic area of the user. A method is also provided for inferring (from all or some of the above predictions) which services the user may access at the said future location and possibly taking preemptive action to make these services readily available prior to said future time. Additionally, a method is provided for inferring (from all or some of the above predictions) what/which computation and communication resources (hardware/software/storage bandwidth, licenses, etc.) will be needed to support the services the user may access at the said future location and possibly taking preemptive action to make these needed resources readily available prior to said future time. Furthermore, a method is described for providing the user with access to the said transported subset of personal data files and said services when requested at the said future time.

DETAILED DESCRIPTION

One embodiment of the invention provides a method for predictive internet service provisioning and data migration using user location prediction. In order to minimize data access latency and network congestion, the method predicatively prepositions data closer to the user, anticipating one or more of the following future attributes of the user:
1) where/when the user will need the data in the future,
2) what activity the user will be engaged in and/or in what context the user will be (business meeting, hotel stay, airport, home, etc.) in the future
3) what computing, network and other IT resources the user will need in the future.

User location, time, context, and/or needs in the future are predicted through the integration and tracking of time/space/context/needs databases of the user (for example, calendars, electronic travel itineraries, Outlook applications, etc.), conditioned on the information that the user is willing to allow access to.

These predictive techniques can further be used to enable various functionalities. For example, the infrastructure could know where the user will be at some point in time and move data to an appropriate network site, so that when a user launches a computing session there, the session can be executed fast and with high performance and minimum network congestion. Moreover, the infrastructure could combine information from two or more user time/space databases associated with two or more corresponding users and notify the users that they could meet when they are both at the same location and have available time slots. Many other possibilities are feasible. For example, knowing when a user is scheduled to have a meeting of some nature in some room and with whom, the infrastructure (say a smart office building) could turn on the appropriate lights, set up the appropriate audiovisual equipment, download the appropriate video content for presentations, predicatively set up appropriate web streaming sessions and conference call sessions with off-site participants of the meeting, stream and put up on computer screens presentation slides, etc. In addition, when a user A is scheduled to meet with another user B physically, and it is known that user A is scheduled to land at an airport at a given time before the meeting, e.g., from information provided in user A's Outlook calendar, and it becomes apparent that user A's plane is delayed by extracting information from publicly available information on the internet, then user B could automatically be informed about user A's delay.

Such a system/network/service architecture leveraging user location information to automatically position relevant data near each user's physical location substantially reduces unnecessary real-time traffic over long distances and also greatly reduces data access latency and would provide key advantages over the systems/networks available today.

Exemplary Elements of the Architecture

Figure 1A:
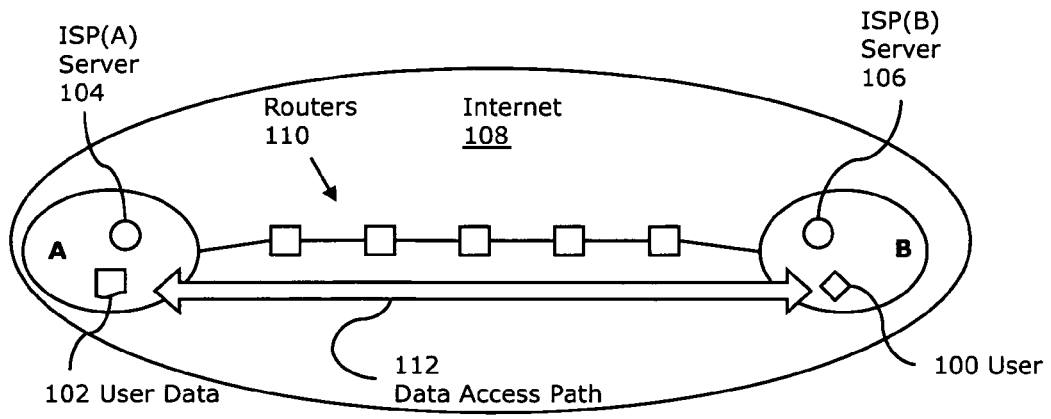
FIG. 1A is a schematic diagram illustrating servers in geographical regions A and B connected by the internet via a series of routers, according to the prior art.
Figure 1B:
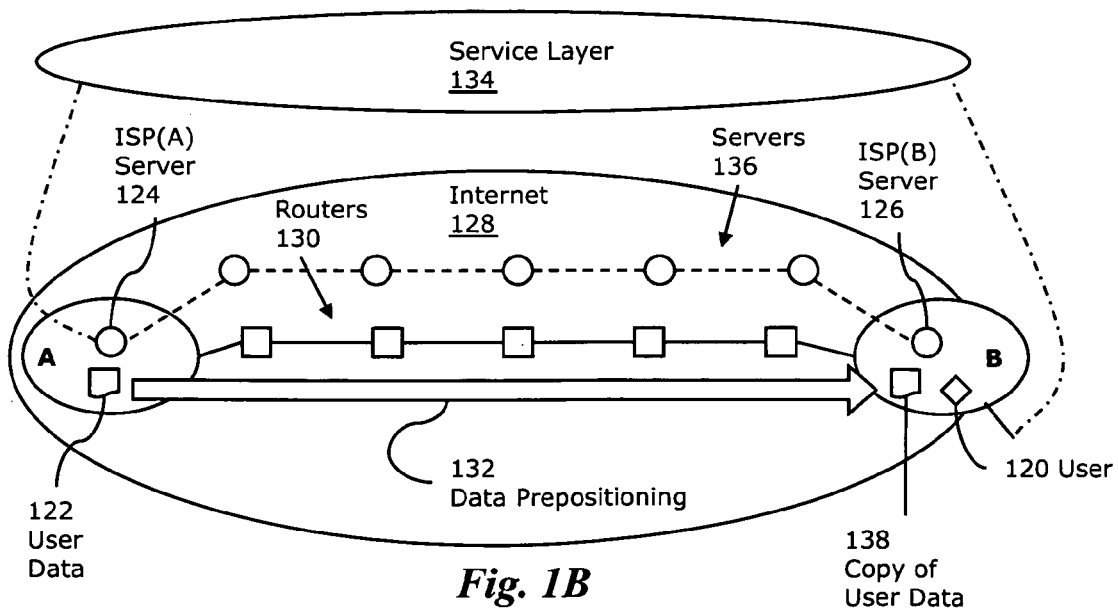
FIG. 1B is a schematic diagram illustrating servers in geographical regions A and B connected by the internet via a series of routers, including a service layer, according to one aspect of the invention.

FIG. 1B is a schematic diagram of a system implementing a preferred embodiment of the invention. The circles represent servers 136 and the squares represent routers 130. The oval A represents the ISP(A) service provider domain at the home/office base of the user 120 in area A. The ISP(A) service area contains ISP(A) server 124 which stores user data 122. The oval B represents the ISP(B) service provider domain at the remote area B that the user 120 is currently traveling in (and from which is now connecting to the internet). The ISP(B) service area contains ISP(B) server 126 which stores a copy of user data 138 that has been transported from ISP(A) server 124 via data prepositioning 132, as will be described in more detail below. The oval 128 represents the internet and the top oval 134 represents the service layer, where the virtual connection service operates from the user terminal at the remote location B to the user account in ISP(A).

Figure 2:
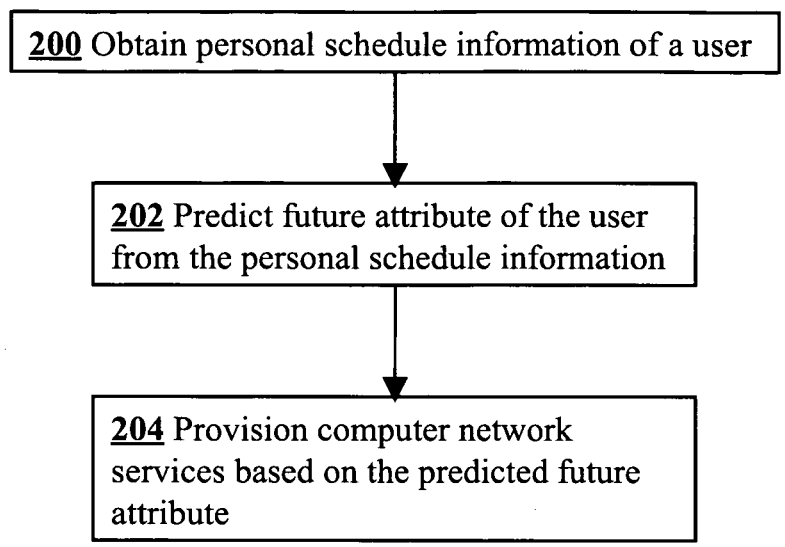
FIG. 2 is a flowchart illustrating the main steps performed in an embodiment of the invention.

An outline of the major steps performed in an embodiment of the invention is shown in FIG. 2. In step 200 personal schedule information of a user is obtained. This personal schedule information is used in step 202 to predict one or more future attributes of the user. In step 204 computer network services for the user are provisioned based on these predicted future attributes. These steps will now be described in more detail with reference to FIG. 1B.

In one embodiment, the infrastructure system/network architecture may include one or more of the following exemplary elements, which may be implemented as software running on one or more dedicated servers, such as one of the servers 136.

User Location Estimation—The system estimates/predicts the current/future position of the user 120, using one or more techniques, including, for example:

Advanced Application Convergence: Location information can be retrieved from automatically accessing applications which are "aware of" the user's location at a given time. If for example, such a system is allowed to access a user's calendar (e.g., Outlook, or similar, which may be part of user data 122) and such calendar and schedule information is stored in a format allowing to deduce a physical location from a calendar entry, the user's "next location" can be predicted by the system in advance.

The system may use various techniques to confirm a prediction of user attributes and/or independently estimate or determine current user attributes. These techniques, for example, may include:

First Login: When the user accesses the internet for the first time from ISP(B) server 126 in area B (after having accessed it before from ISP(A) server 124 in area A), the system infers that the user is in area B. Presumably, area B (say, in California) is far enough from area A (say, in Germany) so that the user needs time in the order of hours to physically get from one area to another. Thus, when the system sees the user logging in from a certain area it may infer that he will stay in that area for a while (except, perhaps, if the user is accessing from an airport while on a short layover between flights).

Cell Position Correlation: When a business (or even leisure) traveler lands at an airport in area B, the first thing he typically does is to turn on his cell phone/PDA. At that point, the local cellular network knows which area the user is currently in (assuming that portable phone/PDA device is carried by its assigned user, as would normally be the case). This information can be passed on to the internet infrastructure and, hence, the latter can identify the user as currently being in area B.

Biometric Correlation: For mission critical businesses/organizations with offices at various places (hospital chains, large corporations, etc.), government agencies with offices across a country or the world (embassies/ consulates, etc.), as well as in the military, employees may be authorized in the future using biometric methods (electronic reading of fingerprints, eye patterns, voice recognition, etc.) when they enter an office/facility. In that case, when a user is biometrically identified in an area, his location information could be passed on to the internet. The above techniques may also be intelligently combined to obtain more accurate predictions of future locations and/or estimates of current locations.

System/Network Operations—When the network estimates/infers that a user has moved or will move from home/office base area A to a new area B, it may initiate a number of actions to prepare to (a) authenticate the user in the new area B, (b) position useful data closer to him, and/or (c) allocate access and processing resources in service providers that cover area B and have service level agreements with ISP(A). Such actions may include one or more of the following.

Local Authentication: When the user is identified as being in area B by a service provider ISP(B) that has some service level agreement with ISP(A), then ISP(B) requests from ISP(A) an "authentication package/module" for the user. This is some information that ISP(B) can use to authenticate the user and admit it locally in area B to access certain allowable services. The ISP(A) sends the pertinent information to ISP(B), which the latter uses to authenticate and admit the user.

Data Positioning: Given that the user is or will be in the domain of ISP(B) and has been or will be authenticated there, the ISP(A) starts pushing user data to appropriate ISP(B) servers and positioning them closer to the user in area B, so that user-to-data access latency will be minimized. This data transfer and positioning could involve storage area networks and intelligent routers that are responsive to the data nature, migration requirements and end-storage needs. Data that are pushed to ISP(B) servers from ISP(A) servers may include computing environment customization files, most-recently accessed files by the user, updates of files like mailboxes and user databases, etc. Moreover, the system preferably will push files that are (or may be) relevant to the user operating in location B (say, in his corporate office in area B). Actually, various location-sensitive services that the user accesses in area B may require user data to be brought from ISP(A) and positioned locally. With the continuously growing importance of small and powerful mobile devices, this service feature will become more and more important. Being able to enhance/enrich existing personal data with "location information" will allow such a system to automatically provide "locally relevant" information to the user's (mobile) device. For example, we can introduce distributed and automatically updated "personal data and information fountains" which are located all over the world and act and re-act as nodes in an autonomous, meshed network.

Resource Allocation: ISP(B) may also allocate computing, storage and communication resources to provide the required quality of service to the user, according to his service contract established with ISP(A). Even email and other personal information being sent to the user while he is at the new location could directly be sent to the communication server nearby, which is serving as the personal data and information fountain at that particular time.

Service Level Agreements: To perform the above system/network/service functions, ISP(A) may have established a service level agreement (SLA) with ISP(B), which governs various issues, ranging from security and quality of service to billing and pricing. Of course, the user has established an SLA with ISP(A) and via it with all other collaborating ISP throughout the world. The SLA establishment and enforcement may take several forms, including:

Static: ISP(A) has pre-established SLAs with a unique ISP in area B, which takes on the responsibility to serve the user when in area B.

Dynamic: When the user travels to area B and activates his terminal device (phone/PDA/laptop, etc.) several local service providers that cover area B, say ISP1(B), ISP2(B), ISP3(B), etc. may compete for admitting and serving the user, by contacting ISP(A). The latter could dynamically decide which one to authorize to serve the user in area B (using reputation network technology, for example).

Service-Session Switching

Some embodiments may also be implemented together with a method for autonomously authenticating the user at a remote location by transferring an authentication module across the network to a service access point closer to the current user location, as per service-level agreements (SLA) between participating service providers. The introduced architecture treats the service session (its logical functional modules and relevant user data) as being independent of the user's home base and as autonomously existing on the network. It can be automatically configured on-demand (when needed and called for) at the user's network neighborhood to enable and deliver the service. This architecture/technique is herein called Service-Session Switching (S3). Although a user may continue to have a primary service provider (in the home base), the service structures he accesses may not be tied to that provider but float with the user across many providers. For example, the S3 User Identity (authentication information, description of subscribed features, personal data, etc.) may not typically reside only in the primary service provider's systems. Instead, it may be automatically provided and available for use in different locations around the world, as "close" to the current physical location of the user as possible. The user buys access to the (logical) service, but given her/his current state (location, etc.) the infrastructure switches and controls the service-session in order to provide the logical service at appropriate quality to the user in the most efficient way for the network. For example the network can decide what data to transfer closer to the user and/or which server to direct the user to, given his information/computation needs. This above architecture deviates from the classical internet service paradigm, where the traveling user accesses and authenticates himself by establishing secure, logically circuit-switched connections to his service provider's physical data center location and typically receives all stored data from there.

The S3 User Identity available to trusted service provisioning parties on the internet may be comprised of a number of attributes. We provide some examples below, whose combinations constitute various sample embodiments:

User-ID: For example, a worldwide unique identification of user

Primary (Local) Service Provider ID: For example, a worldwide unique identification of the user's primary service provider. Mainly used to ensure billing and payment of services to the end user. Service Provider for such services may not necessarily be telecommunications companies in the "classical" sense. For example, a credit card company could function as a primary service provider, provided it has enough roaming and service agreements with data center and telecommunication operators. The key to being a service provider in this sense could be to have a customer relationship to the user.

Autonomous Authentication Component: For example, a worldwide standardized method of authenticating the user. This authentication could be independent of the user's primary service provider, so the user can easily change his primary service provider if necessary.

Service Level Agreements: For example, agreements that define the services and their conditions of use with regard to quality (reliability, bandwidth, latency, etc.) for the user. Different SLA levels may be needed in order to distinguish between services provided by the primary service provider (which the primary provider can actually control and be held responsible for) and those being used through "remote" service providers.

Determiner for Personal Data and Information Fountain: For example, such a structure could be used to determine which personal data and information is going "to follow" the user automatically around the world. It doesn't have to be a big "container" itself, but rather could be a "pointer" to the relevant information and thus has to be part of the S3 User Identity.

Personal Encryption key or part thereof: Since privacy issues, data security and data protection are going to be key for the usage of such a system, the user's individual encryption key should be part of the S3 User Identity. Encryption and the keys have to be selected in a way that the sole knowledge of this part of the key is insufficient for decryption.

Finally, we note that the introduced Service-Session Switched (S3) architecture substitutes the concept of service access via a logical "circuit-switched" connection to the servers of the home-base service provider, with the concept of the service session logically existing independently of providers and being assembled on-demand and switched from provider to provider depending on the geographic position of the user.

The invention claimed is:

1. A method for predictive computer network service provisioning comprising:
   obtaining personal schedule information of a user located in a first geographic location and made available on a network,
   providing a service session, including functional modules and relevant data particular to the user, that exists autonomously on the network and independently from a home base service provider of the user,
   providing access to the service session to a plurality of different types of service providers through a service layer which exists on top of an infrastructure of the network such that the service session is switchable among the service providers for assembly on demand at a network neighborhood that the user is in,
   providing a user identity of the user that is accessible on demand to the service providers in the service session regardless of respective geographic locations of the service providers and the user, the user identity including a unique identifier of the user, a unique identifier of a primary service provider of the user, an individual encryption key of the user and a container of pointers indicating where the relevant data particular to the user resides,
   predicting a future attribute of the user from the personal schedule information, the predicted future attribute including a future second geographic location of the user, and
   providing a service to the user prior to the user arriving at the second geographic location using the predicted future attribute in combination with publicly available information on the internet.

2. The method of claim 1, further comprising provisioning computer network services, based on the predicted future attribute, by positioning the user data from a first server in the first geographic location to a second server in the second geographic location.

3. The method of claim 2, wherein the provisioning computer network services further comprises:
   selecting, based on data positioning preferences set by the user, a subset of the user data; and
   prepositioning the selected subset of the user data to the second server such that user-to-data access latency is reduced.

4. The method of claim 2, wherein the predicted future attribute includes an activity the user will be engaged in.

5. The method of claim 4, wherein the provisioning computer network services further comprises allocating computer network services appropriate to the activity the user will be engaged in.

6. The method of claim 2, wherein the predicted future attribute includes computation, storage, and communication needs of the user.

7. The method of claim 6, wherein the provisioning computer network services further comprises allocating computing resources to provide a quality of service to the user appropriate to the computation, storage, and communication needs of the user.

8. The method of claim 2, wherein the user data is positioned to the second server prior to the user entering a domain of the second server.

9. The method of claim 2, wherein the provisioning computer network services includes transferring authentication information of the user across the network to a service access point at the second geographic location prior to the user arriving at the second geographic location.

10. The method of claim 2, wherein the provisioning computer network services comprises:
    enhancing and enriching the user data with location-relevant information based on the second geographic location, and
    prepositioning the enhanced and enriched personal data to the second server such that user-to-data access latency is reduced.

11. The method of claim 1, wherein the user identity further comprises an autonomous authentication component and service level agreements that define services and their conditions of use.

12. The method of claim 1, wherein the user data includes information relevant to the second geographic location.

13. The method of claim 1, wherein the user data includes computing environment customization files and most-recently accessed files by the user.

14. The method of claim 1, wherein the providing the service is performed by a service provider having a customer relationship with the user.

15. The method of claim 14, wherein the service provider is an entity other than a telecommunications company.

16. The method of claim 1, wherein the service is not a telecommunications service.

17. The method of claim 1, wherein the service is a billing service.

18. The method of claim 1, wherein the service includes informing of a change in the personal schedule information or arranging infrastructure associated with the future attribute.

19. The method of claim 1, wherein the primary service provider is a credit card company.

* * * * *